US006711507B2

(12) United States Patent
Koshinaka et al.

(10) Patent No.: US 6,711,507 B2
(45) Date of Patent: Mar. 23, 2004

(54) COMPRESSED AIR MONITOR SYSTEM FOR MONITORING LEAKAGE OF COMPRESSED AIR IN COMPRESSED AIR CIRCUIT

(75) Inventors: Hiroshi Koshinaka, Nukata-gun (JP); Rokurou Yamazaki, Chiryu (JP); Koichi Hoshisaki, Kariya (JP); Tadayuki Yukutake, Nukata-gun (JP); Katsumi Ochi, Obu (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/401,255

(22) Filed: Mar. 27, 2003

(65) Prior Publication Data

US 2003/0187595 A1 Oct. 2, 2003

(30) Foreign Application Priority Data

Mar. 29, 2002 (JP) ....................................... 2002-094059

(51) Int. Cl.[7] ............................. G01F 1/00; G01F 7/00
(52) U.S. Cl. ......................................................... 702/45
(58) Field of Search ............................ 702/45, 47, 127; 73/40

(56) References Cited

U.S. PATENT DOCUMENTS 4,513,604 A * 4/1985 Frantz et al. .................. 73/39
RE33,075 E * 10/1989 Holm et al. ................... 73/40
4,870,859 A * 10/1989 Twerdochlib ................ 73/203
5,884,649 A * 3/1999 Proudman ...................... 137/7
6,516,707 B2 * 2/2003 Elberson ...................... 91/435

FOREIGN PATENT DOCUMENTS

JP 5-164651 6/1993

* cited by examiner

*Primary Examiner*—John Barlow
*Assistant Examiner*—Demetrius Pretlow
(74) *Attorney, Agent, or Firm*—Harness, Dickey & Pierce, PLC

(57) ABSTRACT

A flow meter is installed in a supply line of compressed air connected with air-driven devices in a compressed air circuit and measures a flow rate of compressed air in the supply line. A monitor computer receives measured flow rate data from the flow meter. The monitor computer includes an operational state identifying means for identifying a current operational state of the air-driven devices from a plurality of categorized operational states of the air-driven devices. The monitor computer further includes an air leakage determining means for determining a level of leakage of compressed air in the compressed air circuit through comparison of the measured flow rate data with a corresponding one of a plurality of master flow rates, which corresponds to the current operational state of the air-driven devices identified by the operational state identifying means.

6 Claims, 4 Drawing Sheets

COMPRESSED AIR MONITOR SYSTEM FOR MONITORING LEAKAGE OF COMPRESSED AIR IN COMPRESSED AIR CIRCUIT

CROSS REFERENCE TO RELATED APPLICATION

This application is based on and incorporates herein by reference Japanese Patent Application No. 2002-94059 filed on Mar. 29, 2002.

BACKGROUND OF THE INVENTION

1. Field of the Invention

The present invention relates to a monitor system that monitors leakage of compressed air in a compressed air circuit installed in, for example, a manufacturing facility.

2. Description of Related Art

Air-driven devices, such as air cylinders, that use compressed air as its drive source are used in, for example, various manufacturing facilities.

Generally, a plurality of air-driven devices is connected to a single supply line, which extends from a compressed air source, to form a compressed air circuit.

Currently, it is difficult to completely and permanently eliminate leakage of compressed air at a connection of each air-driven device connected to the compressed air circuit. Thus, all of the air-driven devices need to be periodically inspected for leakage of compressed air to manage leakage of compressed air in the compressed air circuit. Specifically, the leakage of compressed air is detected by an operator through use of some or all of the human senses, for example, by listening to sound of leaked air from each air-driven device or by feeling air pressure of leaked air from each air-driven device with a hand. Then, the operator may determine whether repair work is needed based on the inspection result. Alternately, the leakage of compressed air can be determined as follows. That is, when the leakage of compressed air becomes severe, the corresponding air-driven device may malfunction. At that time, because of the malfunction of the air-driven device, the operator can notice the leakage of compressed air for the first time. When the operator notices the leakage of compressed air, the corresponding manufacturing facility may be stopped, and the corresponding portion, from which compressed air leaks, may be repaired.

However, the above leakage management operations of compressed air pose the following disadvantages.

That is, since the periodic inspection of the air-driven devices depends on the human senses and needs to be performed on all of the air-driven devices, the number of steps involved in the inspection is relatively large. Furthermore, the periodic check of leakage of compressed air poses the following disadvantage. That is, if the leakage of compressed air starts during a time interval between one inspection operation and the next inspection operation, this leakage of compressed air cannot be detected unless it causes malfunction of the corresponding air-driven device. Thus, wasteful compressed air is kept consumed until the next periodic inspection and subsequent repair work are performed.

When the degree of leakage of compressed air becomes severe, and thus the corresponding air-driven device malfunctions, the facility, in which the malfunctioning air-driven device is installed, needs to be stopped immediately, and the corresponding repair work needs to be performed.

This normally causes a delay in the operational plan of the facility, resulting in a reduction in a working ratio of the facility.

SUMMARY OF THE INVENTION

The present invention addresses the above disadvantages. Thus, it is an objective of the present invention to provide a compressed air monitor system, which continuously monitors leakage of compressed air in a corresponding facility to allow a reduction in the number of inspection steps and to restrain sudden stop of the facility and wasteful consumption of compressed air in the facility.

To achieve the objective of the present invention, there is provided a compressed air monitor system that monitors leakage of compressed air in at least one compressed air circuit, each of which includes a supply line of compressed air and a plurality of air-driven devices. The air-driven devices are connected to the supply line and are driven by compressed air supplied through the supply line in each compressed air circuit. The compressed air monitor system includes at least one flow meter and a monitor computer. Each flow meter is installed in the supply line of a corresponding one of the at least one compressed air circuit and measures a flow rate of compressed air, which indicates an amount of compressed air that passes through the corresponding supply line per unit time. Each flow meter outputs the measured flow rate of compressed air as measured flow rate data. The monitor computer receives the measured flow rate data from each flow meter. The monitor computer includes an operational state identifying means for identifying a current operational state of the air-driven devices of each compressed air circuit from a plurality of categorized operational states of the air-driven devices. The monitor computer further includes an air leakage determining means for determining a level of leakage of compressed air in each compressed air circuit through comparison of the measured flow rate data of the corresponding compressed air circuit with a corresponding one of a plurality of master flow rates, which corresponds to the current operational state of the air-driven devices identified by the operational state identifying means. Each of the plurality of master flow rates is set for a corresponding one of the categorized operational states of the air-driven devices and is used as a reference flow rate of compressed air in the corresponding one of the categorized operational states of the air-driven devices.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION (First Embodiment)

A compressed air monitor system according to a first embodiment of the present invention will be described with reference to FIGS. 1–4.

Figure 1:
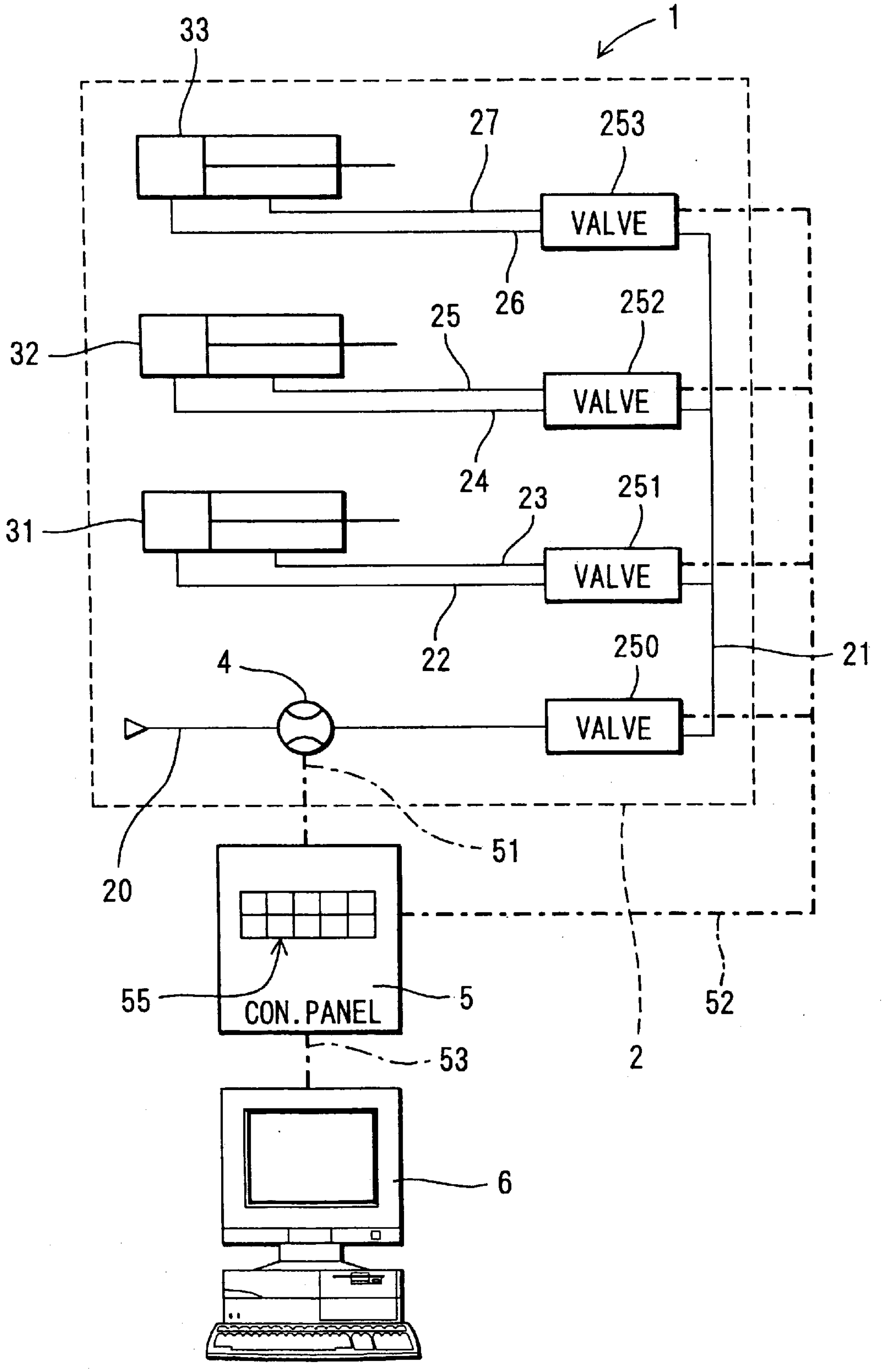
FIG. 1 is a schematic view of a compressed air monitor system according to first and second embodiments of the present invention.

With reference to FIG. 1, the compressed air monitor system 1 of the present embodiment is used to monitor leakage of compressed air in a compressed air circuit 2. The compressed air circuit 2 includes a supply line 20 of compressed air and a plurality of air-driven devices 31–33. The supply line 20 is connected to a compressed air source. The air-driven devices 31–33 are connected to the supply line 20 and are driven by compressed air (serving as a drive source) supplied through the supply line 20.

An air flow meter 4 is arranged in the supply line 20 to measure a flow rate of compressed air, which indicates an amount of compressed air that passes through the supply line 20 per unit time. The flow meter 4 transmits measured flow rate data, which indicates the measured flow rate, to a monitor computer 6.

The monitor computer 6 includes an operational state identifying means for identifying a current operational state of the air-driven devices 31–33 of the compressed air circuit 2 from a plurality of categorized operational states of the air-driven devices 31–33. The monitor computer 6 further includes an air leakage determining means for determining a level of leakage of compressed air in the compressed air circuit 2 through comparison of the measured flow rate data with a corresponding one of a plurality of master flow rates, which corresponds to the current operational state of the air-driven devices 31–33 identified by the operational state identifying means. Each of the plurality of master flow rates is set for a corresponding one of the categorized operational states of the air-driven devices 31–33 and is used as a reference flow rate of compressed air in the corresponding one of the categorized operational states of the air-driven devices 31–33.

In the compressed air circuit 2 of the present embodiment, four valves 250–253 are connected to the single supply line 20. Among the four valves 250–253, the first valve 250 serves as a main valve that enables and disables supply of compressed air to the rest of the compressed air circuit 2, i.e., to the other three valves 251–253. The other three valves 251–253 are used to operate the corresponding air-driven devices 31–33, which are air cylinders in this instance.

The supply line 20 is first connected to the first valve 250, and the other three valves 251–253 are connected to a flow line 21 that extends from the valve 250. Two flow lines 22–27 extend from each of the other three valves 251–253 and are connected to a corresponding one of the air-driven devices 31–33.

The compressed air monitor system 1 of the present embodiment further includes a control panel 5 that is electrically connected to the flow meter 4 through an electric line 51. All of the valves 250–253 are electrically connected to the control panel 5 through an electric line 52 to provide the control panel 5 with information about a current open/close state of each air-driven device 31–33, i.e., a current operational state of each air-driven device 31–33.

Furthermore, in the present embodiment, the operational states of the air-driven devices 31–33 in the compressed air circuit 2 are categorized into two states, i.e., an activated state and a deactivated state. The activated state refers to a state where one or all of the air-driven devices 31–33 of the compressed air circuit 2 are operated, or activated. The deactivated state refers to a state where all of the air-driven devices 31–33 are stopped, or deactivated. The current operational state of the air-driven devices 31–33 is identified from the two states in the following manner. That is, when the first valve 250 is opened to enable supply of compressed air to the other valves 251–253, the current operational state is identified as the activated state. When the first valve 250 is closed to disable supply of compressed air to the other valves 251–253, the current operational state is identified as the deactivated state.

Furthermore, the control panel 5 is connected to the monitor computer 6 through an electric line 53. The flow rate data and the information of operational state of the compressed air circuit 2 are transmitted from the control panel 5 to the monitor computer 6.

In the present embodiment, an accumulated flow rate is measured with the flow meter 4 during each period of five minutes, and this flow rate is transmitted to the monitor computer 6 through the control panel 5 as flow rate data F at every five minute interval. Furthermore, when the flow rate data is transmitted from the control panel 5 to the monitor computer 6, information about the current operational state, i.e., activated state or deactivated state is also transmitted from the control panel 5 to the monitor computer 6.

The operational state identifying means of the monitor computer 6 receives information about the current operational state from the control panel 5 and determines whether the current operational state in the compressed air circuit 2 is the activated state or the deactivated state.

The air leakage determining means of the monitor computer 6 of the present embodiment determines a level of air leakage for each of the above two operational states through three determination steps and outputs a result of its determination. Specifically, in each operational state of the air-driven devices 31–33, when it is a normal state where there is substantially no air leakage, the leakage determining means outputs normal state information. When there is a moderate level of air leakage, which does not require immediate repair work, the air leakage determining means outputs a leakage alert. When there is a severe level of air leakage, which is above a certain level and requires immediate repair work, the air leakage determining means outputs a repair requesting alert, which requests corresponding repair work.

The above three-step determination process is performed using two master flow rates, i.e., a first master flow rate M1, which is used as the reference value during the deactivated state, and a second master flow rate M2, which is used as the reference value during the activated state. When the flow rate data F, which is the current measured value, is below a corresponding one of the first master flow rate M1 and the second master flow rate M2, the normal state information is outputted. When the flow rate data F exceeds a corresponding one of the first master flow rate M1 and the second master flow rate M2 by an amount that is equal to or less than 10% of a corresponding one of the first master flow rate M1 and the second master flow rate M2, the leakage alert is outputted. When the flow rate data F exceeds a corresponding one of the first master flow rate M1 and the second master flow rate M2 by an amount that is more than 10% of the corresponding one of the first master flow rate M1 and the second master flow rate M2, the repair requesting alert is outputted.

The first master flow rate M1 of the present embodiment is chosen to be a value that is about 110% of measured flow rate data, which is measured when all of the air-driven devices 31–33 are deactivated while minimizing air leakage from each air-driven device 31–33 in the compressed air circuit 2.

The second master flow rate M2 of the present embodiment is chosen to be a value that is about 110% of measured flow rate data, which is measured when all of the air-driven devices 31–33 are activated while minimizing air leakage from each air-driven device 31–33 in the compressed air circuit 2.

Figure 2:
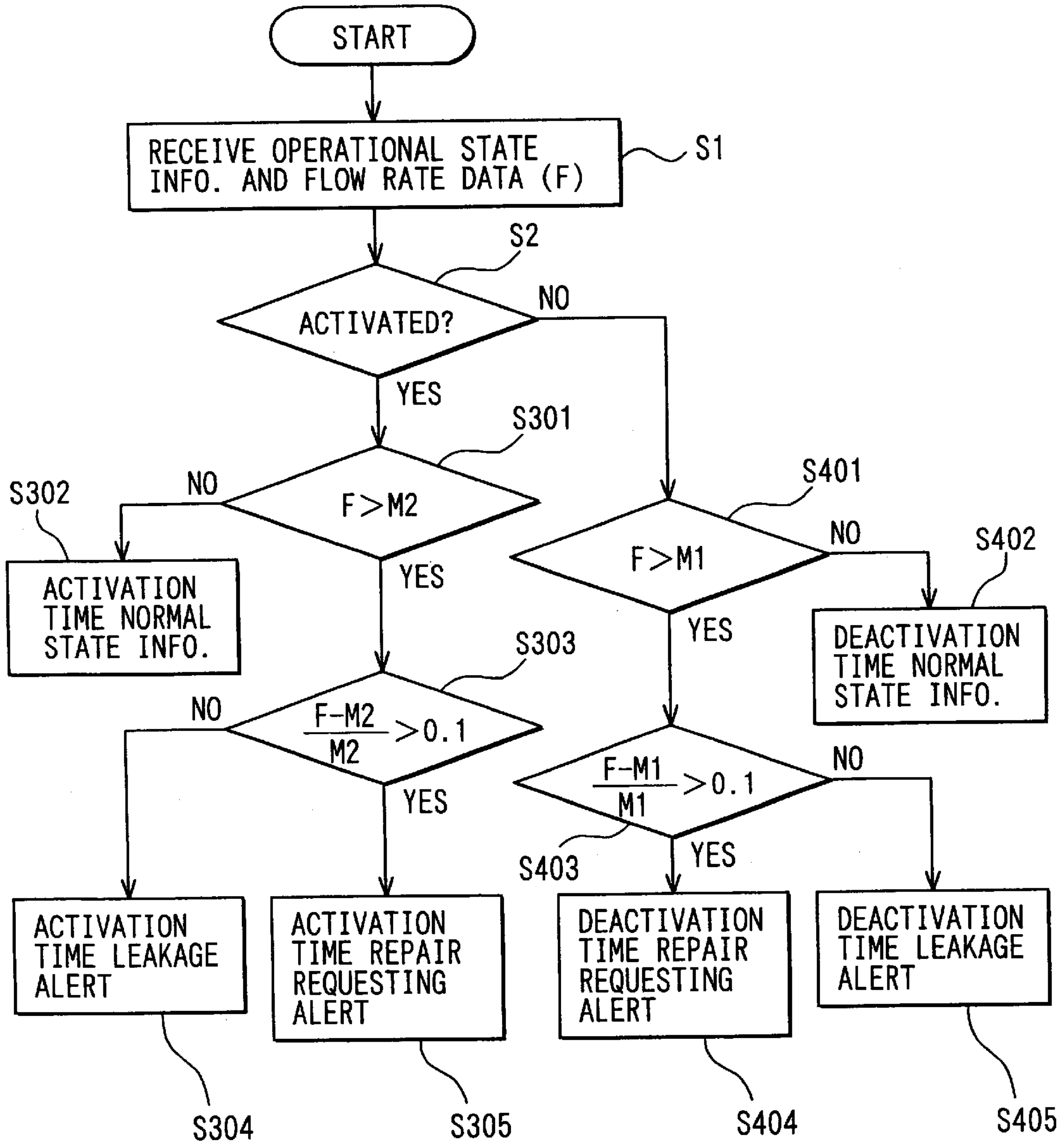
FIG. 2 is a flow chart illustrating process flow of a monitor computer according to the first embodiment.

A process performed in the monitor computer 6 will be described with reference to FIG. 2.

First, at step S1, the monitor computer 6 receives the operational state information and the flow rate data F from the control panel 5.

Next, at step S2, the monitor computer (more specifically the operational state identifying means) 6 determines whether the current operational state is the activated state.

When the current operational state is determined to be the activated state at step S2, control proceeds to step S301. At step S301, it is determined whether the flow rate data F is greater than the second master flow rate M2. When it is determined that the flow rate date F is not greater than the second master flow rate M2 at step S301, control proceeds to step S302 where activation time normal state information, which indicates the normal state during the activation period (i.e., during the period of the activated state), is outputted.

On the other hand, when it is determined that the flow rate data F is greater than the second master flow rate M2 at step S301, control proceeds to step S303. At step S303, it is determined whether a difference between the flow rate data F and the second master flow rate M2 exceeds 10% over the second master flow rate M2. When it is determined that the difference does not exceed 10% over the second master flow rate M2 at step S303, control proceeds to step S304 where an activation time leakage alert, which indicates the moderate level of air leakage during the activation period, is outputted. On the other hand, when it is determined that the difference exceeds 10% over the second master flow rate M2 at step S303, control proceeds to step S305 where an activation time repair requesting alert, which indicates the severe level of air leakage during the activation period, is outputted.

When it is determined that the current operational state is not the activated state at step S2, control proceeds to steps S401. At step S401, it is determined whether the measured flow rate data F is greater than the first master flow rate M1. When it is determined that the flow rate data F is not greater than the first master flow rate M1 at step S401, control proceeds to step S402 where deactivation time normal state information, which indicates the normal state during the deactivation period (i.e., during the period of deactivated state), is outputted.

When it is determined that the flow rate data F is greater than the first master flow rate M1 at step S401, control proceeds to step S403. At step S403, it is determined whether a difference between the flow rate data F and the first master flow rate M1 exceeds 10% over the first master flow rate M1. When it is determined that the difference between the flow rate data F and the first master flow rate M1 does not exceed 10% over the first master flow rate M1, control proceeds to step S405 where a deactivation time leakage alert, which indicates the moderate level of air leakage during the deactivation period, is outputted. On the other hand, when it is determined that the difference exceeds 10% over the first master flow rate M1 at step S403, control proceeds to step S404 where a deactivation time repair requesting alert, which indicates the severe level of air leakage during the deactivation period, is outputted. The above-described steps S301–S305 and S401–S405 correspond to the leakage determining means of the present invention.

An exemplary monitoring process performed through use of the compressed air monitor system 1 will be described with reference to FIGS. 3 and 4.

Figure 3:
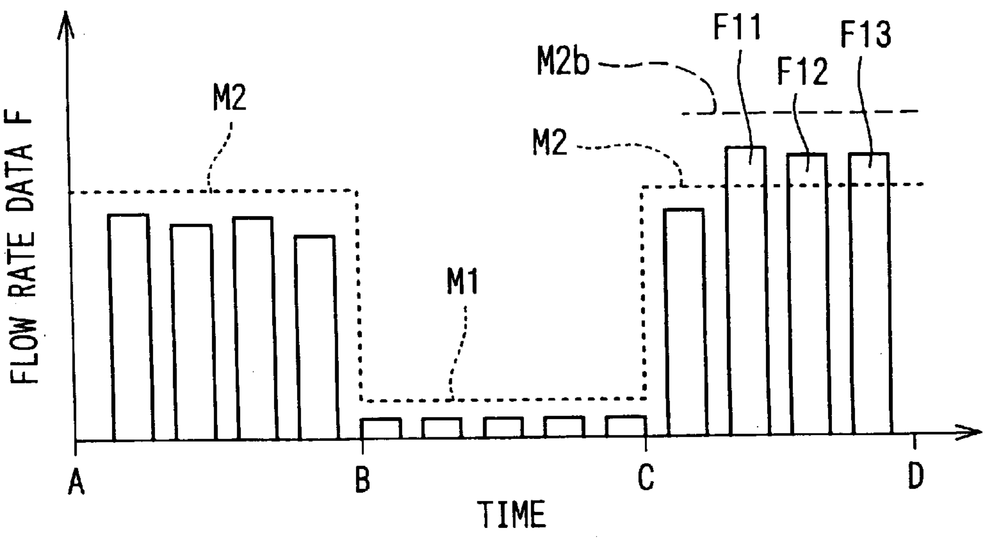
FIG. 3 is a graph showing exemplary flow rate data according to the first embodiment.
Figure 4:
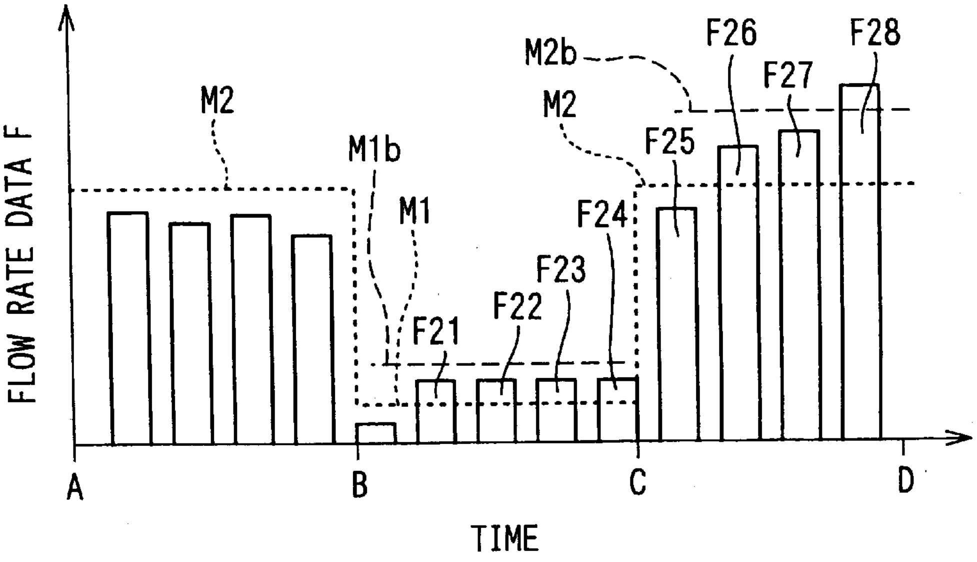
FIG. 4 is a graph showing exemplary flow rate data, which is different from that of FIG. 3, according to the first embodiment.

In each of FIGS. 3 and 4, an axis of abscissas indicates time, and an axis of ordinates indicates the flow rate data F. In each of FIGS. 3 and 4, each of a time period between points A and B and a time period between points C and D corresponds to the activated state, i.e., the activation period, and a time period between points B and C corresponds to the deactivated state, i.e., the deactivation period.

In the exemplary case of FIG. 3, the flow rate data F is measured four times between points A and B, and each of the four measured flow rate data F between points A and B is lower than the second master flow rate M2. Thus, the activation time normal state information is outputted. Furthermore, the flow rate data F is measured five times between points B and C, and each of the five measured flow rate data F between points B and C is below the first master flow rate M1. Thus, the deactivation time normal state information is outputted.

In the time period between points C and D of FIG. 3, the flow rate data F11, which is the second measured value, exceeds the second master flow rate M2 by an amount less than 10% of the second master flow rate M2 for the first time. Thus, at this time point, the activation time leakage alert is outputted. Furthermore, the flow rate data F12 and the flow rate data F13 also exceed the second master flow rate M2 but are below a value of M2*b*, which indicates a 10% increase over the second master flow rate M2. Thus, the activation time leakage alert is outputted.

Based on such information, an operator, who is monitoring the monitor computer 6, can initiate, for example, planning of inspection of the facility upon consideration of a working ratio of the facility when the activation time leakage alert is outputted for the first time.

Similarly, in the case of FIG. 4, the flow rate data F is measured four times between points A and B, and each of the four flow rate data F between points A and B is lower than the second master flow rate M2. Thus, the activation time normal state information is outputted. Furthermore, the flow rate data F is measured five times between points B and C, and each of the second to fifth flow rate data F21–F24 between points B and C is above the first master flow rate M1 but is less than a value of M1*b*, which indicates a 10% increase over the first master flow rate M1. Thus, the deactivation time leakage alert is outputted.

Furthermore, in the time period between points C and D, the first measured flow rate data, i.e., the measured value F25 is below the second master flow rate M2, and thus the activation time normal state information is outputted. Furthermore, although the flow rate data F26 and F27 are both greater than the second master flow rate M2, the flow rate data F26 and F27 do not exceed 10% over the second master flow rate M2. Thus, the activation time leakage alert is outputted at this point. Furthermore, the flow rate data F28 exceeds the value of M2*b*, which indicates the 10% increase over the second master flow rate M2. Thus, the activation time repair requesting alert is outputted.

Based on such information, when the activation time repair requesting alert is outputted, the operator, who is monitoring the monitor computer 6, can take appropriate measures, such as initiation of planning of repair work at the next off period of the facility.

As described above, the compressed air monitor system 1 of the present embodiment continuously receives the flow rate data measured with the flow meter 4 and continuously monitors the operational state to execute the air leakage determining means. Thus, when the air leakage starts or when the amount of air leakage is increased rapidly, it is possible to detect occurrence of such a state.

When the air leakage is detected, it is possible to take the best measures. Thus, there is no need to wait for the periodic inspection. In this way, it is possible to prevent sudden stop of the facility and to restrain wasteful consumption of the compressed air.

Practical use of the compressed air monitor system 1 allows monitoring of leakage of compressed air for a long period of time. Thus, it is possible to predict the next possible start time of leakage of the compressed air. Also, it is possible to predict the possible start time of increasing of leakage of compressed air to the sever level. As a result, more effective management of the air leakage is possible.

In the present embodiment, the exemplary compressed air circuit 2, which includes the three air-driven devices 31–33, is used. However, it should be understood that the compressed air monitor system of the present embodiment can be applied to a compressed air circuit, which includes more than three air-driven devices. The determination procedure performed by the air leakage determining means of the monitor computer 6 should be regarded as one example, and various other determination procedures are possible.

(Second Embodiment)

In a second embodiment, the control panel 5 of the compressed air monitor system 1 of the first embodiment includes an individual operating means for individually operating (i.e., activating) each of all the air-driven devices 31–33 of the compressed air circuit 2. The control panel 5 includes a group of switches 55 (FIG. 1) for individually operating (i.e., activating) the air-driven devices 31–33.

In the second embodiment, when the occurrence of air leakage is detected by the air leakage determining means, or when increasing of air leakage to the severe level is detected by the air leakage determining means, it is possible to identify the air-driven device(s), from which the compressed air is leaked, through use of the individual operating means.

That is, flow rate data, which is indicated by the flow meter 4, is read while all of the air-driven devices 31–33 are deactivated by the individual operating means. Then, the air-driven devices 31–33 are operated, or activated, one after the other by the individual operating means, and flow rate data, which is indicated by the flow meter 4, is read after each time a corresponding one of the air-driven devices 31–33 is activated. At this time, through identification of a change pattern of the flow rate data, it is possible to identify the air-driven device, which causes the air leakage.

Thus, unlike the previously proposed periodic inspection, it is not required to inspect all of the air-driven devices 31–33, and it is only required to inspect and repair the identified air-driven device, which causes the air leakage, to retune the compressed air circuit 2 to its normal state.

The advantages of the second embodiment other than those described above are the same as those of the first embodiment.

In the second embodiment, the flow rate is directly read from the flow meter 4 when the air-driven devices 31–33 are activated one after the other. Alternatively, the flow rate data obtained by the flow meter 4 may be displayed on the monitor computer 6 or the control panel 5, and the displayed flow rate data may be read from the monitor computer 5 or the control panel 5.

Furthermore, in the control panel 5, a switch for inputting an individual operation start signal may be provided as a part of the individual operating means. When the individual operation start signal is inputted, each of all the air-driven devices 31–33 may be automatically, sequentially operated, or activated, for a predetermined time period.

In such a case, the monitor computer 6 may receive and store information, which identifies the individually activated air-driven devices, and the flow rate data, which is measured with the flow meter 4. Thereafter, the information and the flow rate data may be retrieved and outputted together from the monitor computer 6 later on.

(Third Embodiment)

Figure 5:
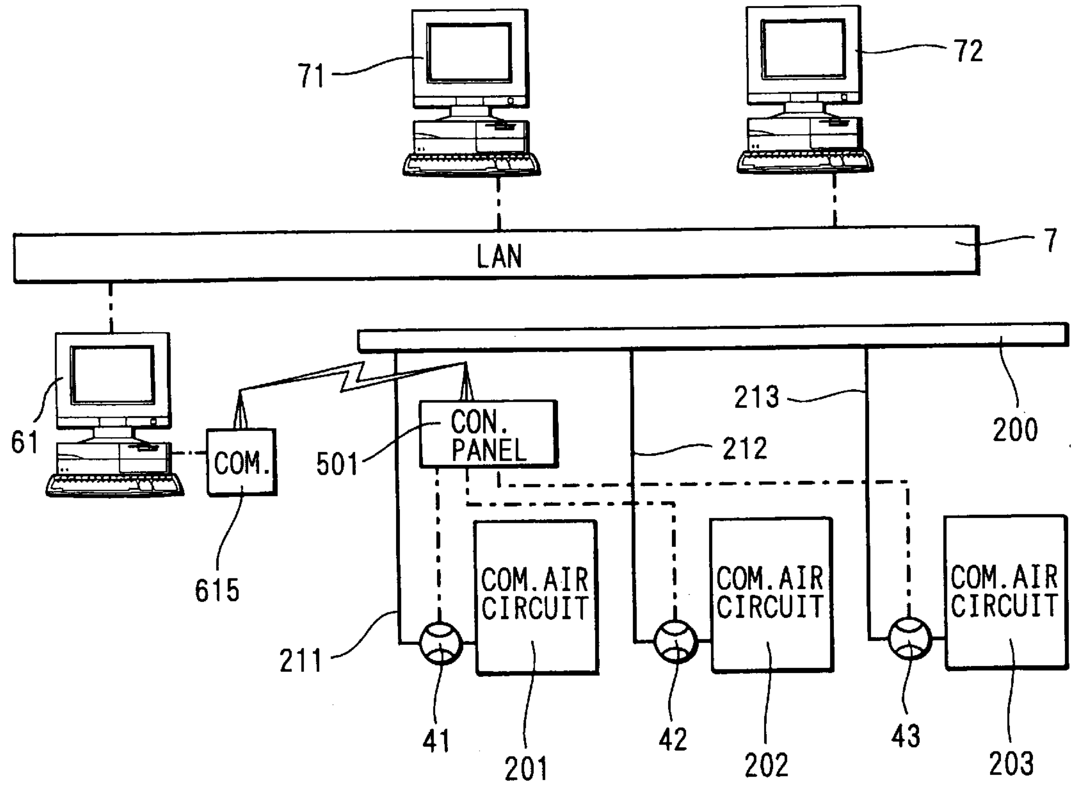
FIG. 5 is a schematic view of a compressed air monitor system according to a third embodiment of the present invention.

With reference to FIG. 5, in a third embodiment, there is provided a plurality of compressed air circuits 201–203, each provided with a corresponding flow meter 41–43.

In the present embodiment, the monitor computer 61 receives flow rate data from the flow meter 41–43 of each compressed air circuit 201–203.

Specifically, each flow meter 41–43 is arranged in a corresponding supply line 211, 212, 213, which is branched from a main flow line 200 connected to a source of compressed air. Furthermore, a plurality of corresponding air-driven devices (not shown) is connected to each compressed air circuit 201–203. Each flow meter 41–43 transmits measured flow rate data to the monitor computer 61 through a common control panel 501. The control panel 501 receives state information indicating opening/closing of a corresponding valve, which controls a corresponding air-driven device, through an electric line (not shown).

The control panel 501 is capable of performing radio communications with a radio communication device (radio communication means for performing radio communications) 615 connected to the monitor computer 61. The control panel 501 transmits various data to the monitor computer 61 through the radio communication device 615. The use of the radio communication means allows a higher degree of freedom in terms of location of the monitor computer 61 in the facility and also allows elimination of a cost required for installing communication lines in the facility.

The monitor computer 61 serves as the operational state identifying means and the air leakage determining means of each compressed air circuit 201–203 in a manner similar to those of the first embodiment. Specifically, the monitor computer 61 outputs the six different types of information, i.e., the activation time normal state information, the activation time leakage alert, the activation time repair requesting alert, the deactivation time normal state information, the deactivation time leakage alert and the deactivation time repair requesting alert in a manner similar to that discussed with reference to FIG. 2 for each compressed air circuit 201–203.

Furthermore, in the compressed air monitor system of the third embodiment, the monitor computer 61 is connected to a local area network (LAN) 7. Client computers 71, 72, which are connected to the LAN 7, can obtain the monitor information outputted from the monitor computer 61, i.e., the normal state information, the leakage alert and the repair requesting alert of each compressed air circuit 201–203.

In the third embodiment, the monitor computer 61 can collectively monitor the compressed air circuits 201–203 to allow simplification of the monitoring operation. Furthermore, through use of the client computers 71, 72, there is achieved a higher degree of freedom in the monitoring operation.

Advantages of the third embodiment other than those described above are the same as those of the first embodiment.

In the above-described first to third embodiments, the operational states of the air-driven devices are categorized into two states, i.e., the activated state, in which one or all of the air-driven devices are activated, and the deactivated state, in which all of the air-driven devices are deactivated. The operational state identifying means identifies the current operational state of the air-driven devices from the activated state and the deactivated state. The master flow rate (i.e., the second master flow rate) used in the activated state is preferably greater than the master flow rate (i.e., the first master flow rate) used in the deactivated state.

With the above arrangement, it is easy to categorize the operational states of the air-driven devices, and it is easy to identify the current operational state of the air-driven devices.

The master flow rates used in the above embodiments include the first master flow rate and the second master flow rate. The first master flow rate is determined based on the measured flow rate data that is measured when all of the air-driven devices are deactivated under the normal state where air leakage from each air-driven device in the compressed air circuit is minimized. The second master flow rate is determined based on the measured flow rate data that is measured when the normal operation of the air-driven devices is maintained for a relatively long period of time.

The first master flow rate is obtained by adding a predetermined allowable amount of air leakage (this is 10% in the above embodiments but is not limited to this value) to the measured flow rate data that is measured when all of the air-driven devices are deactivated under the normal state. The second master flow rate is obtained by adding a predetermined allowable amount of air leakage (this is 10% in the above embodiments but is not limited to this value) to the maximum measured flow rate data that is measured when the normal operation of the air-driven devices is maintained for the relatively long period of time.

In the second embodiment, the individual operating means is provided in the control panel 5. Alternatively, the individual operating means may be provided in the monitor computer 6. That is, the monitor computer 6 may have an individual operating mode, and the monitor computer 6 may activate each of the air-driven devices 31–33 sequentially under the individual operating mode. At that time, the monitor computer 6 may read, store and/or display flow rate data, which is indicated by the flow meter 4, after each time a corresponding one of the air-driven devices 31–33 is activated. It should be understood the individual operating means can be provided in the compressed air monitor system of the third embodiment.

Furthermore, in the second embodiment, since all of the air-driven devices are tested, it is possible to effectively identify the malfunctioning air-driven device that causes the air leakage. Also, since the individual operation of the air-driven devices 31–33 is simplified during the inspection of air leakage, work load of the operator can be effectively reduced. This is particularly true when the compressed air circuit includes a relatively large number of air-driven devices. The automatic individual operation of the air-driven devices may be achieved through setting of, for example, a sequencer.

Additional advantages and modifications will readily occur to those skilled in the art. The invention in its broader terms is therefore not limited to the specific details, representative apparatus, and illustrative examples shown and described.

What is claimed is:

1. A compressed air monitor system that monitors leakage of compressed air in at least one compressed air circuit, each of which includes a supply line of compressed air and a plurality of air-driven devices, wherein the air-driven devices are connected to the supply line and are driven by compressed air supplied through the supply line in each compressed air circuit, the compressed air monitor system comprising:

at least one flow meter, each of which is installed in the supply line of a corresponding one of the at least one compressed air circuit and measures a flow rate of compressed air, which indicates an amount of compressed air that passes through the corresponding supply line per unit time, wherein each flow meter outputs the measured flow rate of compressed air as measured flow rate data; and a monitor computer that receives the measured flow rate data from each flow meter, wherein the monitor computer includes:

an operational state identifying means for identifying a current operational state of the air-driven devices of each compressed air circuit from a plurality of categorized operational states of the air-driven devices; and an air leakage determining means for determining a level of leakage of compressed air in each compressed air circuit through comparison of the measured flow rate data of the corresponding compressed air circuit with a corresponding one of a plurality of master flow rates, which corresponds to the current operational state of the air-driven devices identified by the operational state identifying means, wherein each of the plurality of master flow rates is set for a corresponding one of the categorized operational states of the air-driven devices and is used as a reference flow rate of compressed air in the corresponding one of the categorized operational states of the air-driven devices.

2. A compressed air monitor system according to claim 1, wherein:

the categorized operational states include an activated state and a deactivated state, wherein the activated state is a state where one or all of the air-driven devices of a corresponding one of the at least one compressed air circuit are activated, and the deactivated state is a state where all of the air-driven devices of the corresponding one of the at least one compressed air circuit are deactivated; and the master flow rate used in the activated state is greater than the master flow rate used in the deactivated state.

3. A compressed air monitor system according to claim 1, further comprising an individual operating means for individually operating each of the air-driven devices of each compressed air circuit.

4. A compressed air monitor system according to claim 3, wherein the individual operating means automatically and sequentially operates each of all the air-driven devices of each compressed air circuit for a predetermined time period upon receiving an individual operation start signal.

5. A compressed air monitor system according to claim 1, wherein:

the at least one compressed air circuit includes a plurality of compressed air circuits, and the at least one flow meter includes a plurality of flow meters, so that the monitor computer receives the flow rate data from the flow meter of each of the compressed air circuits; and the operational state identifying means and the air leakage determining means of the monitor computer are provided for each of the compressed air circuits.

6. A compressed air monitor system according to claim 1, wherein the flow rate data is transmitted from the at least one flow meter to the monitor computer through a radio communication means for performing radio communications.

* * * * *